(12) United States Patent
Kodimer

(10) Patent No.: US 10,129,421 B2
(45) Date of Patent: Nov. 13, 2018

(54) SYSTEM AND METHOD FOR REMOTE DEVICE INTERFACE CUSTOMIZATION

(71) Applicants: Kabushiki Kaisha Toshiba, Minato-ku (JP); Toshiba TEC Kabushiki Kaisha, Shinagawa-ku (JP)

(72) Inventor: Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 15/680,720

(22) Filed: Aug. 18, 2017

(65) Prior Publication Data

US 2017/0346970 A1 Nov. 30, 2017

Related U.S. Application Data

(63) Continuation-in-part of application No. 15/455,348, filed on Mar. 10, 2017, now Pat. No. 9,912,826, and
(Continued)

(51) Int. Cl.
*H04N 1/00* (2006.01)
*H04N 1/32* (2006.01)

(52) U.S. Cl.
CPC ....... *H04N 1/00503* (2013.01); *H04N 1/0044* (2013.01); *H04N 1/0097* (2013.01);
(Continued)

(58) Field of Classification Search
CPC ............ H04N 1/00503; H04N 1/0044; H04N 1/00411; H04N 1/00464; H04N 1/00973;
(Continued)

(56) References Cited

U.S. PATENT DOCUMENTS

| 8,842,313 B2 * | 9/2014 | Harrington | ........... G06F 3/1205 |
| | | | 358/1.15 |
| 2008/0065513 A1 * | 3/2008 | McHale | ................. G06Q 30/02 |
| | | | 705/26.3 |

(Continued)

*Primary Examiner* — Allen H Nguyen
(74) *Attorney, Agent, or Firm* — Ulmer & Berne LLP

(57) ABSTRACT

A system and method for generating customized user interface on a multifunction peripheral. The multifunction peripheral has an intelligent controller with a processor and memory, and a document processing engine with functional subsystems subject to software control by the intelligent controller. The intelligent controller functions as a webserver operating through a network interface. A variety of device control applications are stored with each applications configured to engage a corresponding subset of the functional subsystems. Image files generate an interface image corresponding to a device control application on a touchscreen multifunction peripheral interface. The webserver receives selection data corresponding to at least one selected device control application from an associated web client and outputs a web page displaying image files corresponding to each selected device control application image to the web client via the network interface generating a preview image of a customized user interface.

14 Claims, 10 Drawing Sheets

Related U.S. Application Data a continuation-in-part of application No. 15/455,785, filed on Mar. 10, 2017.

(60) Provisional application No. 62/491,553, filed on Apr. 28, 2017, provisional application No. 62/334,634, filed on May 11, 2016, provisional application No. 62/360,581, filed on Jul. 11, 2016.

(52) U.S. Cl.
CPC ..... *H04N 1/00411* (2013.01); *H04N 1/00424* (2013.01); *H04N 1/00464* (2013.01); *H04N 1/00506* (2013.01); *H04N 1/00511* (2013.01); *H04N 1/00973* (2013.01); *H04N 1/32122* (2013.01); *H04N 2201/0094* (2013.01); *H04N 2201/3211* (2013.01)

(58) Field of Classification Search
CPC ........... H04N 1/00424; H04N 1/00506; H04N 1/00511; H04N 1/0097; H04N 1/32122; H04N 2201/0094; H04N 2201/3211
USPC ....................................................... 358/1.13
See application file for complete search history.

(56) References Cited

U.S. PATENT DOCUMENTS

| | | | |
|---|---|---|---|
| 2008/0091800 A1* | 4/2008 | Sorrentino | H04N 1/00244 709/219 |
| 2016/0062573 A1* | 3/2016 | Dascola | G06F 3/0482 715/810 |

* cited by examiner

SYSTEM AND METHOD FOR REMOTE DEVICE INTERFACE CUSTOMIZATION

RELATED APPLICATION DATA

This application claims the benefit of U.S. Patent Application Ser. No. 62/491,553 filed Apr. 28, 2017, which is incorporated by reference in its entirety. This application is also a continuation-in-part of U.S. application Ser. No. 15/455,348, filed Mar. 10, 2017, which claims the benefit of U.S. Provisional Application No. 62/334,634, filed May 11, 2016, both of which are incorporated herein by reference. This application is also a continuation-in-part of U.S. application Ser. No. 15/455,785, filed Mar. 10, 2017, which claims the benefit of U.S. Provisional Application No. 62/360,581, filed Jul. 11, 2016, both of which are incorporated herein by reference.

TECHNICAL FIELD

This application relates generally to configuring device interfaces. This application is more particularly directed to remote customization of touchscreen interfaces for multifunction peripherals via a web interface.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Earlier on, MFPs were operated by users via electromechanical switches, such as pressing a dedicated "copy" button, or by dialing a fax number and hitting a "send" switch when a connection was made to a remote facsimile machine. MFPs have become substantially more powerful, and, correspondingly, more complex for users to operate. MFP devices now typically employ a touchscreen user interface. Various functions and controls can be displayed and selected by a screen having touch-selectable areas.

SUMMARY

In accordance with an example embodiment of the subject application, a system and method for generating customized user interface on a multifunction peripheral is presented. The multifunction peripheral has an intelligent controller with a processor and memory, and a document processing engine with functional subsystems subject to software control by the intelligent controller. The intelligent controller functions as a webserver operating through a network interface. A variety of device control applications are stored with each applications configured to engage a corresponding subset of the functional subsystems. Image files generate an interface image corresponding to a device control application on a touchscreen multifunction peripheral interface. The webserver receive selections data corresponding to at least one selected device control application from an associated web client and outputs a web page displaying image files corresponding to each selected device control application image to the web client via the network interface generating a preview image of a customized user interface.

BRIEF DESCRIPTION OF THE DRAWINGS

Various embodiments will become better understood with regard to the following description, appended claims and accompanying drawings wherein:

DETAILED DESCRIPTION

Figure 1:
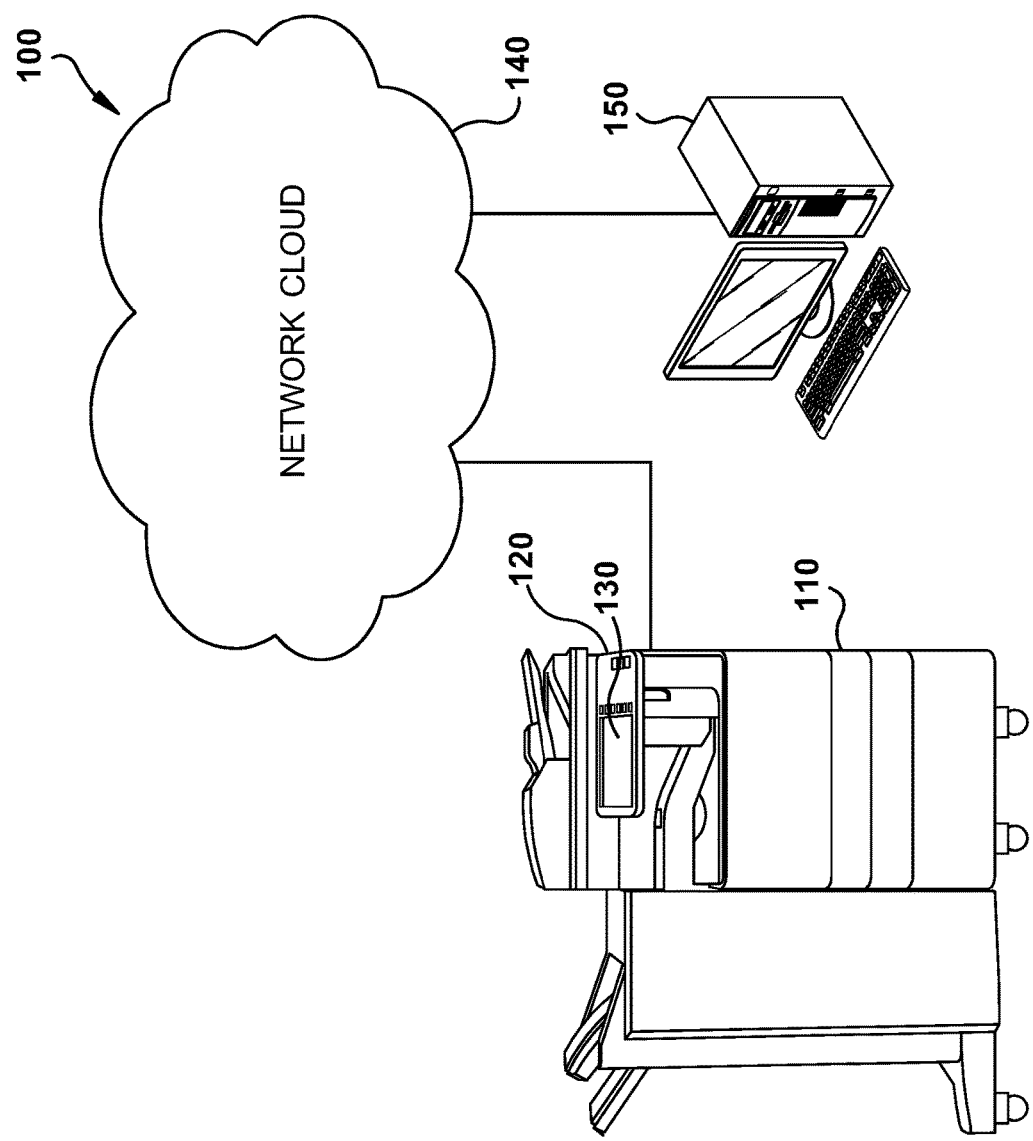
FIG. 1 an example embodiment of a remotely operable user customizable MFP interface system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFP touchscreen user interfaces provide access to a large array of device functions, such as faxing, scanning, printing or e-mailing of documents. Additional selections may be added for functions such as paper size selection, collation, hole punching, stapling, duplex printing or N-up printing of multiple pages on a single sheet. A touchscreen may be used for logging in users, such as with a user ID and password. Touchscreens may also be used for charging job costs to an identified charge account.

It is often desirable for end users to customize their MFP device user interface. For example, a company may wish to eliminate options entirely for color printing to save on printing cost. A company may have a specific need for certain or specialized job functions that might require a user to navigate a complex set of menus each time such a function is to be used. Changing software code for customized interfaces is a complex procedure and therefore generally reserved to the MFP manufacturer. Larger companies may have the resources to hire a device manufacturer to generate a specific user interface for use with a large number of its devices. However, this is cost prohibitive to most end users.

One solution to providing a user customizable interface includes generating a customization interface for users to use. Such capability requires a customization interface that is user-friendly and includes a mechanism for customization that will be fully compatible with their device and readily savable for automatic loading. Such a system is taught by U.S. Patent Application Ser. No. 62/491,553, the disclosure of which is incorporated herein by reference.

Device user interface customization can be accomplished via software running on an intelligent controller of an MFP. User interaction for customization can be accomplished by use of the MFPs integrated touchscreen. Device function customization is suitably accomplished by selection from a menu of callable applications, such as embedded web applications. While this is very useful, it using an MFP touchscreen for customization doesn't allow a user an opportunity to visualize how the custom interface will appear once loaded, particularly as the interface is being setup. Also, a user interface is advantageously updated and customized according to in-house corporate requirements, corporate look-and-feel, and contract of professional services. User interface customization can be completed with a customization file or a series of user interface controls to be configured. With this approach, the user cannot visualize the end result and editing and customization yields unpredictable results. Additionally, it may be inconvenient for an administrator to physically approach one or more MFPs to generate a customized menu.

In accordance with the subject application, FIG. 1 illustrates an example embodiment of a remotely operable user customizable MFP interface system 100 which allows for immediate visualization of how a customized interface screen will appear once implemented. MFP 110 includes a user interface 120 including a touchscreen 130. MFP 110 is in networked data communication to a local area network (LAN), wide area network (WAN) or the global Internet, or any combination thereof, via connection to cloud 140. Also connected to cloud 140 is an administrative terminal 150 which facilitates remote customization of a user interface for MFP 110 as will be detailed below.

Figure 2:
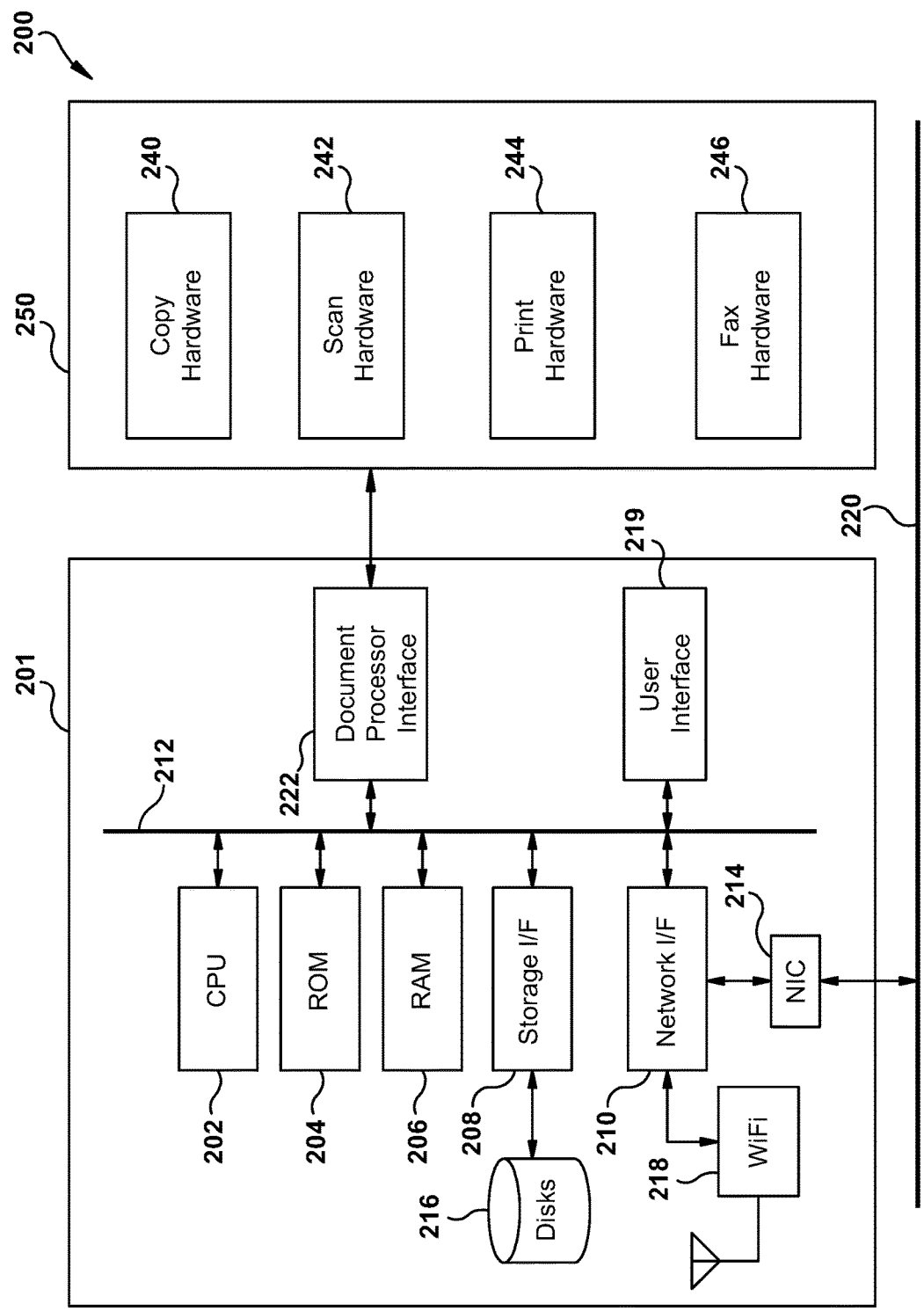
FIG. 2 is an example embodiment of a document rendering system.

Turning now to FIG. 2, illustrated is an example embodiment of a document rendering system 200 suitably comprised within an MFP, such as with MFP 110 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightening, telephone line, or the like. Processor 202 is also in data communication with one or more sensors 219 which provide data relative to a state of the device or associated surroundings, such as device temperature, ambient temperature, humidity, device movement and the like.

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrate example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
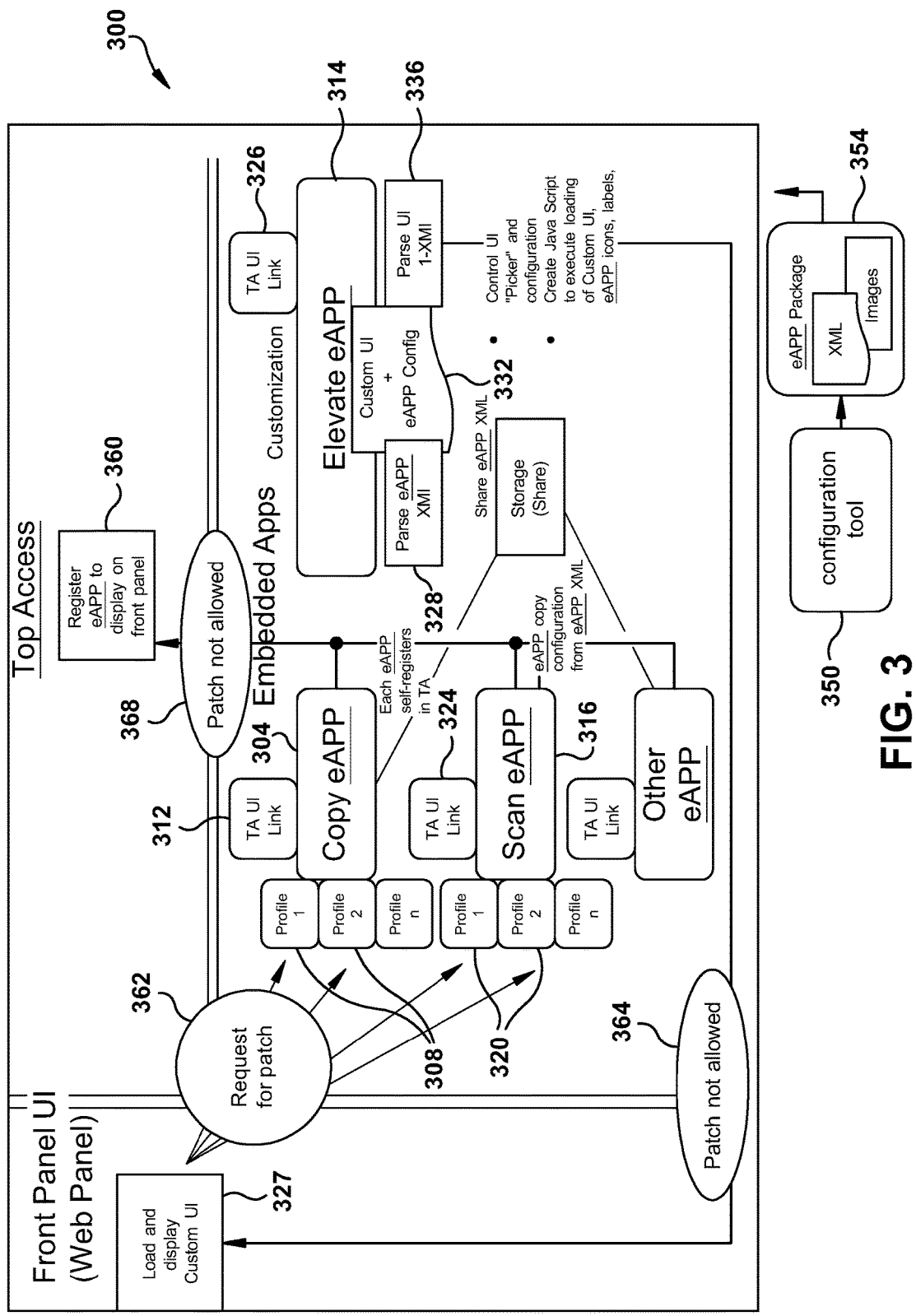
FIG. 3 is an example embodiment of a webserver for a user interface customization tool.

FIG. 3 illustrates an example embodiment of a webserver for an MFP user interface customization tool 300 usable via web client access via a platform such as TOPACCESS. Customization options are selectable from embedded electronic applications (eAPPs). Embedded applications in the illustrated example include a copy eAPP 304 functional to control a device copy function with one or more selectable profiles 308. TOPACCESS user interface link 312 provides for device interaction. Similarly, scan eAPP 316 includes selectable profiles 320 and a TOPACCESS user interface link 324. As a user interface is built, the user can see the results via a rendering of how the configuration would look at 327.

In the example embodiment of FIG. 3, customization is accomplished by another callable eAPP, customization eAPP 314. Customization eAPP 314 include an extensible markup language (XML) eAPP parser 328, a custom user interface and eAPP configurator 332, and an XML user interface parser 336. User interaction via a web interface is accomplished via configuration tool 350 which calls customization eAPP 314 with an eAPP package 354 providing interaction with XML and image files, such as GIF, TIFF, JPEG or any other suitable image file format. Such image files allow for user placement of images such as company logo's, on a user interface. Customization can also include selection of color schemes, menu layout, background images, available device functions and ordering of nested interface screens. Once a user interface is completed, it is registered and displayed at 360. Updating or patching of eAPPS is suitably done via network connection with a manufacturer request 362, which patches may be deemed acceptable or unacceptable for use in eAPPS at 364 or a display at 368. In accordance with the forgoing, a platform is provided for a web based user interface to customize an MFP copier look-and-feel by selecting a template layout, adding resident applications to be placed within the template layout, customization of those applications, and customization of the look and feel using a user interface that provides a realistic preview and in-place editing thereby promoting usability and predictability of results.

Figure 4:
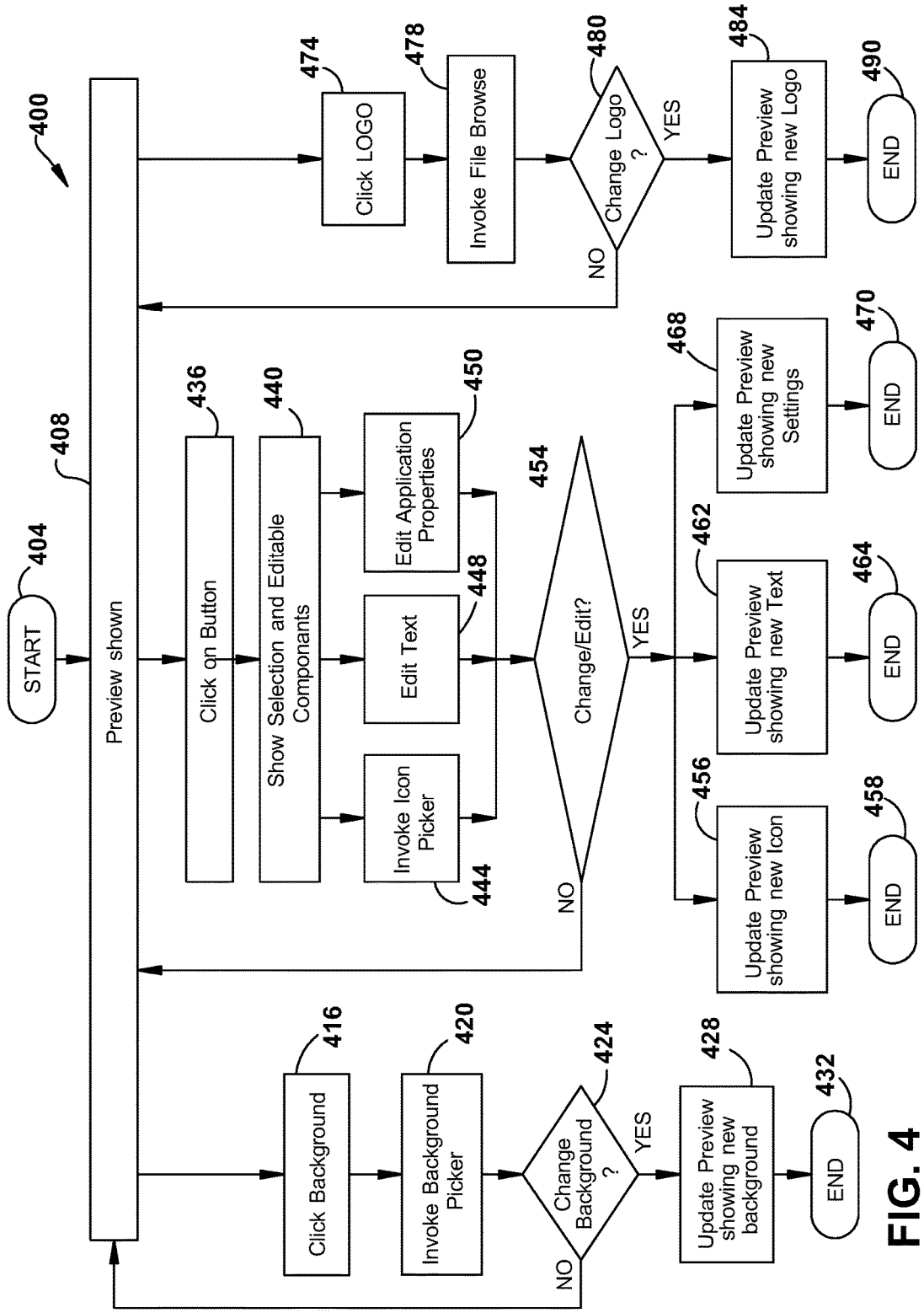
FIG. 4 is a flowchart of an example embodiment of a user interface customization system.

Referring now to FIG. 4, illustrated is a flowchart 400 of an example embodiment of a user interface customization system. Operation commences at 404. A preview screen, suitably initially a default user interface or previously customized user interface is displayed at 408. A user can select to alter a background, suitably by engaging a mouse click on the preview background at block 416. Once selected, the use selects from background options at block 420. If a selection is made as determined at block 424, the background is changed and a preview is generated at block 428. The system suitably returns to preview screen 408, now updated, if more customization is to be done. If not, the process terminates at block 432.

If a user clicks on a button on the preview interface at block 436, they are provided with a selection screen of elements, some of which may be editable as shown in block 440. An icon or other graphical element is selected and invoiced at block 444, and text may be edited at block 448. Properties of an associated application or applications may be edited at block 450. If changes are made and accepted at block 454, then updated views of icons are made at block 456, and the process terminates at block 458 unless additional interface customization is to be made. If so, the process suitably returns to block 408. Similar progress is made for text preview at block 462, optionally terminating if complete at block 464 or returning to block 408 if more customization is desired. Changed settings are suitably previewed at block 468, and the process ends at block 470 or returns to block 408. If changes are not made or accepted, processing returns to block 408.

If a user clicks on a logo, or logo area on the preview interface image at block 474, they are prompted to direct the system to a location of a desired electronic image file at 478 for selection. Once selected at block 480, the preview image is updated at block 484 and the process terminates at block 490. If additional customization is to be made, the process returns to block 408.

Figure 5:
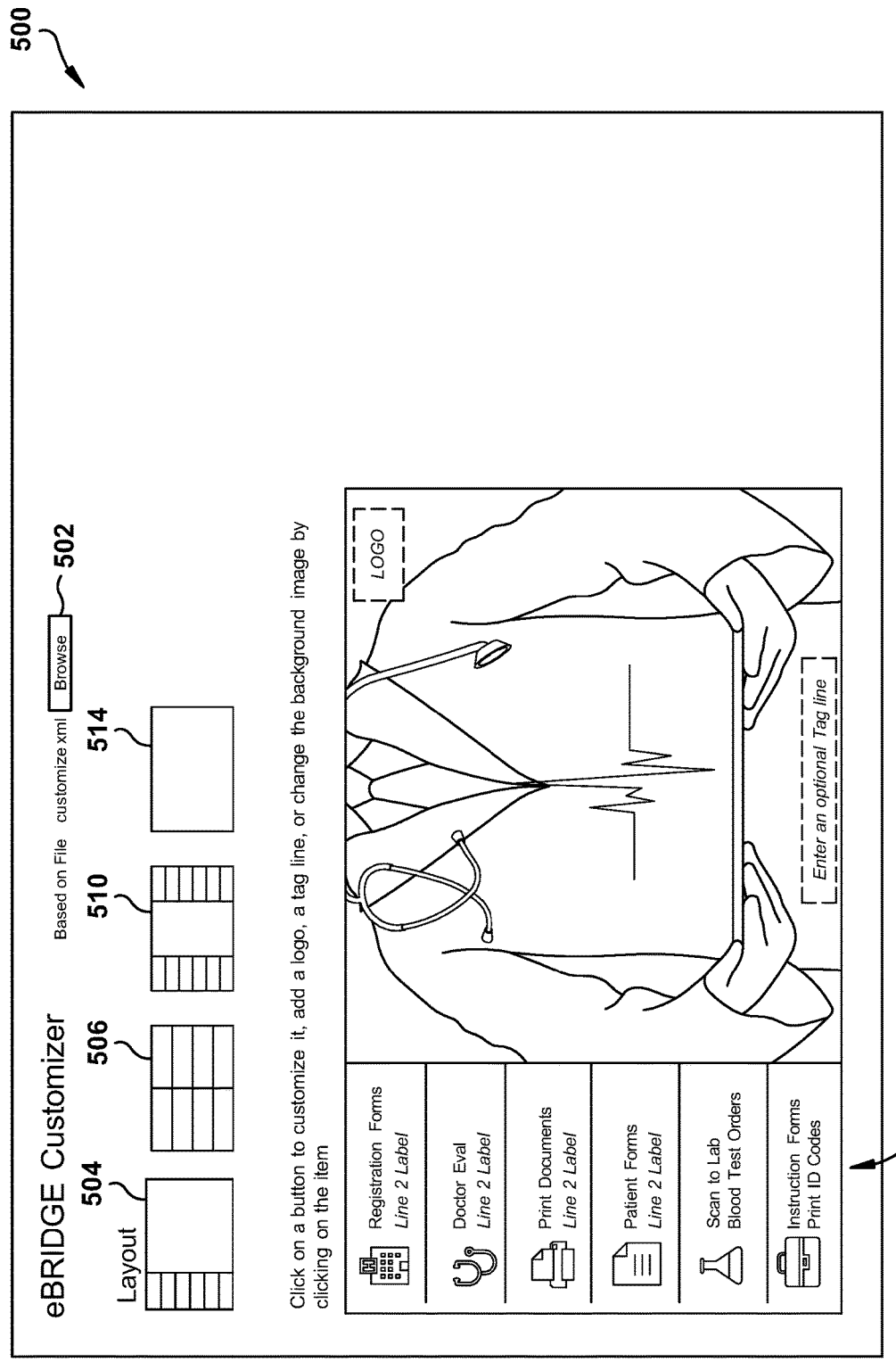
FIG. 5 is an example embodiment of a first interactive preview screen for user interface customization.

FIGS. 5-10 illustrate example embodiments of interactive preview screens for user interface customization. In FIG. 5, web page 500 is generated on a web interface, such as on administrative terminal 150 of FIG. 1. User selects to browse layouts at 502, and layout options 504, 506, 510 and 514 are displayed. For example, the user can select layout 504 and place selectable button areas in a left justified fashion as illustrated at 520.

Figure 6:
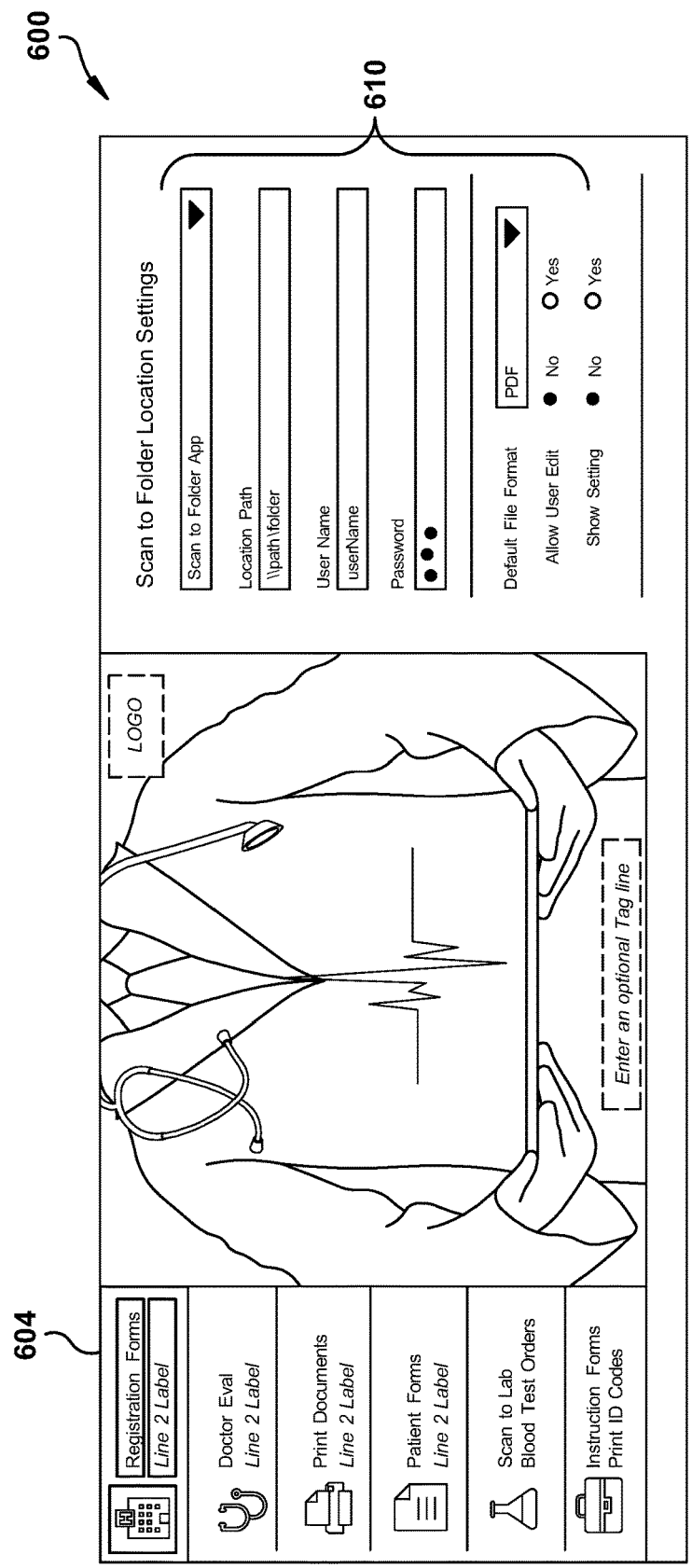
FIG. 6 is an example embodiment of a second interactive preview screen for user interface customization.

FIG. 6 illustrates an example embodiment of a customization screen 600 wherein the user chooses button 604 to load their own customized forms. The user inputs appropriate information at 610 and one or more custom forms are made available through the customized user interface.

Figure 7:
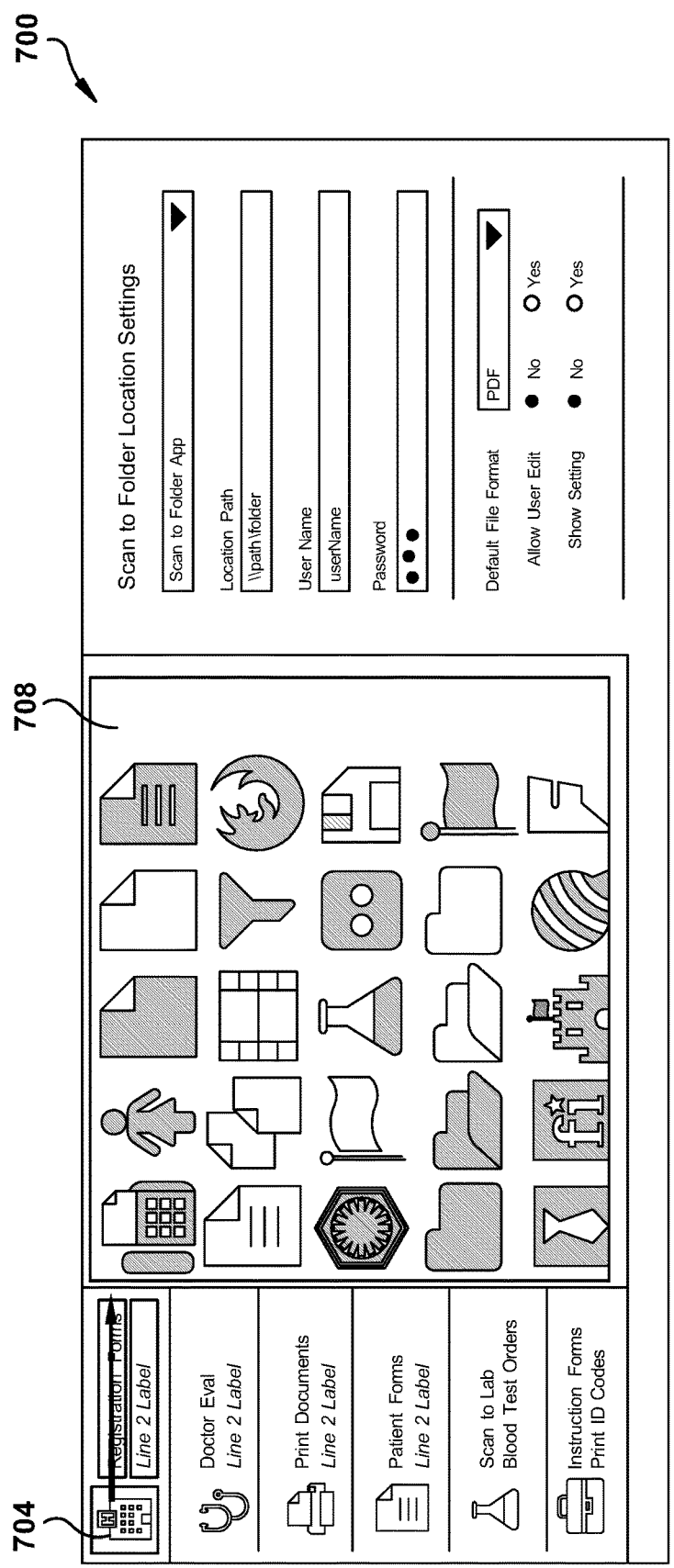
FIG. 7 is an example embodiment of a third interactive preview screen for user interface customization.

FIG. 7 illustrates an example embodiment of a customization screen 700 where the user selects the icon area 704 to select an icon for a button area. A listing of available icons for selection with that control is displayed on screen area 708.

Figure 8:
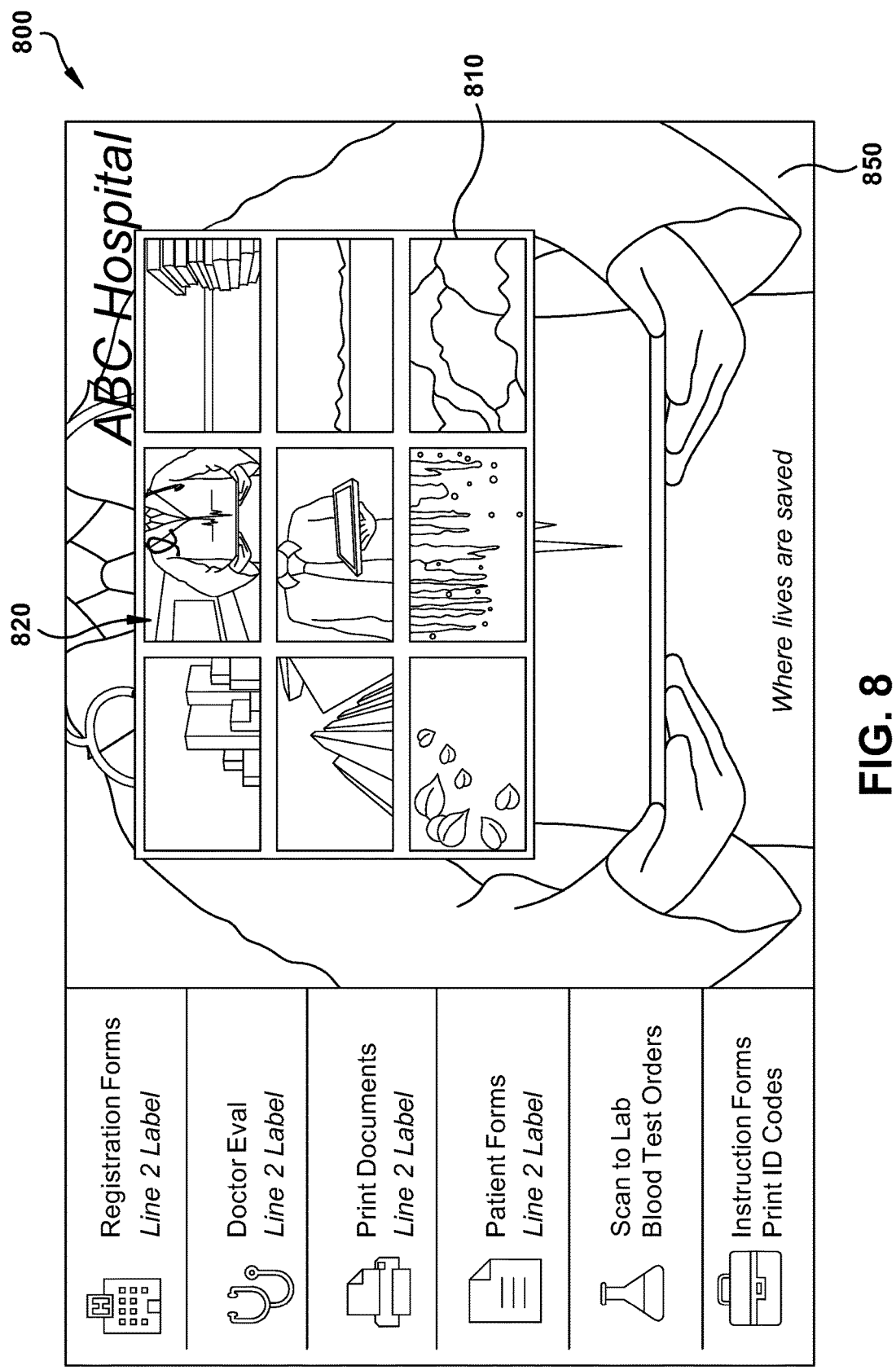
FIG. 8 is an example embodiment of a fourth interactive preview screen for user interface customization.

FIG. 8 illustrates an example embodiment of a preview user interface screen 800 wherein a listing of possible backgrounds is presented at screen area 810. When a selection is made to background 820, it appears on the preview as background area 850.

Figure 9:
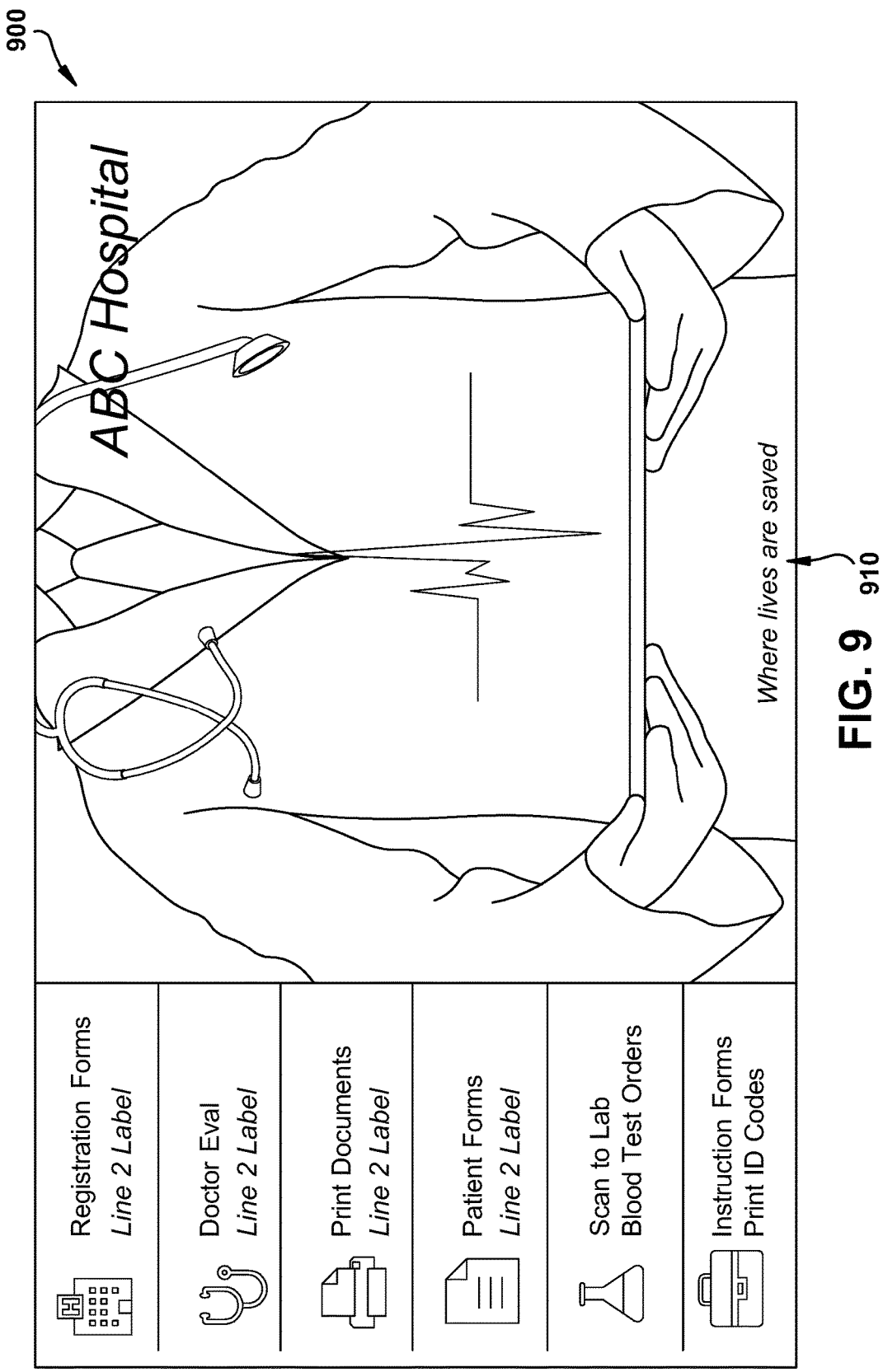
FIG. 9 is an example embodiment of a fifth interactive preview screen for user interface customization.

FIG. 9 illustrates an example embodiment of a preview user interface screen 900 wherein a user clicks on a tagline area 910 to select the tagline "Where lives are saved" for editing.

Figure 10:
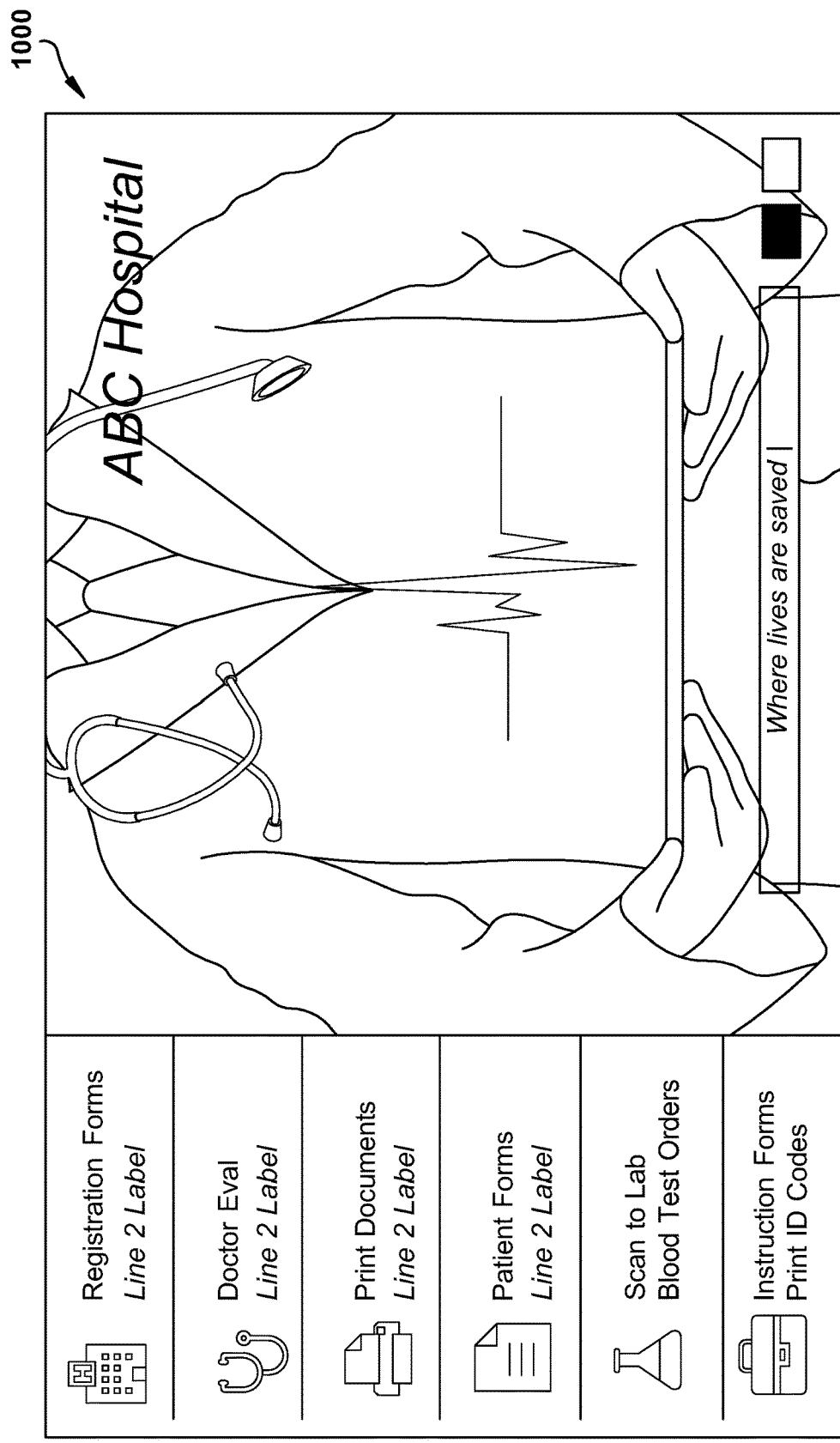
FIG. 10 is an example embodiment of a sixth interactive preview screen for user interface customization.

FIG. 10 illustrates an example embodiment of a preview user interface screen 1000. Selection of the tagline area 910 in FIG. 9 provides a text entry box 1010 in FIG. 10 wherein a modification can be made and stored. In accordance with the forgoing, an intuitive user interface customization tool allows for interface customization, suitably remotely, while a user can see in real time how an interface will look once applied to an MFP.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
    an intelligent controller including a processor and associated memory;
    a document processing engine having a plurality of functional subsystems configured for software-directed operation by the intelligent controller;
    a network interface; and
    a touchscreen user interface,
    wherein the intelligent controller comprises a webserver operable via the network interface,
    wherein the memory is configured to store a plurality of device control applications, each application configured to engage a corresponding subset of the functional subsystems,
    wherein the memory is configured to store a plurality of image files, each image file being configured to generate an interface image corresponding to a device control application on the touchscreen user interface,
    wherein the webserver is configured to receive selection data corresponding to at least one selected device control application from an associated web client, and
    wherein the webserver is further configured to output a web page displaying image files corresponding to each selected device control application image to the web client via the network interface.

2. The multifunction peripheral of claim 1 wherein the webserver is further configured to output the web page with the image files positioned on a rendering of the touchscreen user interface.

3. The multifunction peripheral of claim 2
    wherein the webserver is further configured to receive, from the web client, user-supplied image content data, and
    wherein the webserver is further configured to output the web page displaying an image corresponding to received image content data on the rendering of the touchscreen user interface.

4. The multifunction peripheral of claim 3 wherein the webserver is further configured to generate the web page output displaying a user interface preview image comprised of each image file positioned relative to the rendering in accordance with received positioning data.

5. The multifunction peripheral of claim 4 wherein the webserver is further configured to receive, from the web client, acceptance data corresponding to acceptance of the preview image.

6. The multifunction peripheral of claim 5 wherein the intelligent controller is configured to generate an image on the user interface substantially identical to the preview image and including at least one image file.

7. The multifunction peripheral of claim 6 wherein the intelligent controller is further configured to direct operation of the document processing engine in accordance with a device control application associated with an image file in accordance with a user selection received via the user interface.

8. A method comprising:

storing, in a memory of a multifunction peripheral, a plurality of device control applications, each application configured to direct an intelligent controller to engage a corresponding subset of functional subsystems of a document processing engine of the multifunction peripheral;

storing a plurality of image files in the memory, each image file being configured to generate an interface image corresponding to a device control application on the touchscreen user interface;

receiving selection data corresponding to at least one selected device control application from an associated web client; and outputting, to the web client, a web page displaying image files corresponding to each selected device control application image to the web client via the network interface.

9. The method of claim 8 further comprising generating, by the web server, web page output for displaying the image files positioned on a rendering of the touchscreen user interface.

10. The method of claim 9 further comprising receiving, by the webserver and from the web client, positioning data relative to a selected position of at least one displayed image file relative to the rendering.

11. The method of claim 10 further comprising generating, by the webserver, the web page output displaying a user interface preview image comprised of each image file positioned relative to the rendering in accordance with received positioning data.

12. The method of claim 11 further comprising receiving, by the webserver and from the web client, acceptance data corresponding to acceptance of the preview image.

13. The method of claim 12 further comprising generating, by the intelligent controller, an image on the user interface substantially identical to the preview image and including at least one image file.

14. The method of claim 13 further comprising directing, by the intelligent controller, operation of the document processing engine in accordance with a device control application associated with an image file in accordance with a user selection received via the user interface.

* * * * *